(12) United States Patent
Kriesels

(10) Patent No.: US 9,488,005 B2
(45) Date of Patent: Nov. 8, 2016

(54) METHOD AND SYSTEM FOR TRANSPORTING A HYDROCARBON FLUID

(71) Applicant: SHELL OIL COMPANY, Houston, TX (US)

(72) Inventor: Petrus Cornelis Kriesels, Rijswijk (NL)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 14/441,309

(22) PCT Filed: Nov. 7, 2013

(86) PCT No.: PCT/EP2013/073230
§ 371 (c)(1),
(2) Date: May 7, 2015

(87) PCT Pub. No.: WO2014/072381
PCT Pub. Date: May 15, 2014

(65) Prior Publication Data
US 2015/0267474 A1 Sep. 24, 2015

(30) Foreign Application Priority Data
Nov. 9, 2012 (EP) .................................... 12191923

(51) Int. Cl.
E21B 47/09 (2012.01)
E21B 7/06 (2006.01)
(Continued)

(52) U.S. Cl.
CPC . *E21B 7/06* (2013.01); *E21B 4/00* (2013.01); *E21B 7/043* (2013.01); *E21B 7/046* (2013.01); *E21B 7/20* (2013.01); *E21B 10/26* (2013.01); *E21B 43/103* (2013.01); *E21B 43/108* (2013.01); *E21B 47/09* (2013.01);
(Continued)

(58) Field of Classification Search
None
See application file for complete search history.

(56) References Cited

U.S. PATENT DOCUMENTS 4,553,879 A * 11/1985 Langner .............. E02B 17/0021
175/61
5,411,060 A 5/1995 Chandler
(Continued)

FOREIGN PATENT DOCUMENTS

CN 101910554 12/2010
EP 2041393 1/2001
(Continued)

OTHER PUBLICATIONS

PCT International Search Report, Application No. PCT/EP2013/073230 dated Apr. 15, 2014.

*Primary Examiner* — Matthew R Buck
*Assistant Examiner* — Douglas S Wood

(57) ABSTRACT

A method for transporting a hydrocarbon fluid, such as crude oil and/or natural gas, comprises:
  drilling a chain of double ended U-shaped boreholes into the earth crust, such that at least one pair of the boreholes has an adjacent pair of upper ends at or near the earth surface;
  lining each of the boreholes with an at least partly expanded impermeable liner comprising an expandable tubular, which is circumferentially expanded after insertion into the borehole;
  interconnecting each pair of adjacent upper ends of the chain of lined U-shaped boreholes by a connection conduit; and
  transporting the hydrocarbon fluid through a transportation pipeline with one or more W-shaped sections provided by the chain of lined U-shaped boreholes and the connection conduit.

11 Claims, 2 Drawing Sheets

(51) Int. Cl.
*E21B 7/20* (2006.01)
*E21B 19/00* (2006.01)
*E21B 43/10* (2006.01)
*E21B 7/04* (2006.01)
*F16L 1/028* (2006.01)
*F16L 1/038* (2006.01)
*F16L 1/026* (2006.01)
*E21B 4/00* (2006.01)
*E21B 10/26* (2006.01)

(52) U.S. Cl.
CPC ............... *F16L 1/026* (2013.01); *F16L 1/028* (2013.01); *F16L 1/038* (2013.01)

(56) References Cited

U.S. PATENT DOCUMENTS

| | | | |
|---|---|---|---|
| 2,803,666 | A | 9/1998 | Keller |
| 7,150,328 | B2 | 12/2006 | Marketz et al. |
| 7,464,774 | B2 | 12/2008 | Savignat et al. |
| 7,637,316 | B2 * | 12/2009 | Best ............... E21B 41/0042 166/245 |
| 7,748,466 | B2 * | 7/2010 | Aivalis ............... E21B 4/02 166/156 |
| 8,056,641 | B2 | 11/2011 | Kriesels et al. |
| 8,387,709 | B2 | 3/2013 | Kriesels |
| 8,430,177 | B2 * | 4/2013 | Van Nieuwkoop ....... E21B 7/20 166/384 |
| 8,479,843 | B2 | 7/2013 | Kriesels |
| 8,555,987 | B2 | 10/2013 | Kriesels et al. |
| 2009/0288842 | A1 | 11/2009 | Kriesels |
| 2011/0278009 | A1 * | 11/2011 | Elliott ............... E21B 7/20 166/307 |
| 2012/0138314 | A1 | 6/2012 | Kriesels |

FOREIGN PATENT DOCUMENTS

| | | |
|---|---|---|
| EP | 2209966 | 7/2010 |
| EP | 2460972 | 6/2012 |
| GB | 2070188 | 9/1981 |
| GB | 2456699 | 7/2009 |
| GB | 2467242 | 7/2010 |
| GB | 2469399 | 11/2011 |
| GB | 2469396 | 1/2012 |
| GB | 2468416 | 2/2012 |
| GB | 2467866 | 3/2012 |
| GB | 2468230 | 4/2012 |
| GB | 2469213 | 1/2013 |
| WO | 2008006841 | 1/2008 |
| WO | 2009056514 | 5/2009 |
| WO | 2012059574 | 5/2012 |
| WO | 2012059578 | 5/2012 |
| WO | 2012095472 | 7/2012 |
| WO | 2013004610 | 1/2013 |

* cited by examiner

METHOD AND SYSTEM FOR TRANSPORTING A HYDROCARBON FLUID

CROSS-REFERENCE TO RELATED APPLICATIONS

The present application is a National Stage (§371) of International Application No. PCT/EP2013/073230, filed Nov. 7, 2013, which claims priority from European Application No. 12191923.7, filed Nov. 9, 2012, the disclosures of each of which are hereby incorporated by reference in their entirety.

BACKGROUND OF THE INVENTION

The invention relates to a method and system for transporting a hydrocarbon fluid, such as crude oil and/or natural gas.

It is customary practice to install pipelines for transporting a hydrocarbon fluid in trenches that are subsequently filled with soil and/or rocks to bury and protect the pipeline against damage.

A problem with this known pipeline installation technique is that it is expensive to make deep trenches in the earth crust, so that the trenches are generally only a few meters deep, which may not be adequate to protect the pipeline against freezing and/or ice damage if it is laid in an underwater and/or cold environment, such as an arctic and/or permafrost region.

It is also known to install underground pipelines in U-shaped boreholes that are drilled using a so-called river-crossing drilling technique.

A problem with this known technique for installation of underground pipelines in U-shaped boreholes is that it is difficult to pull the pipeline into and through the U-shaped borehole that may at least partly collapse or otherwise get plugged before or while the pipeline is pulled into and through the U-shaped borehole. This known technique for installing underground pipelines in U-shaped boreholes is therefore only suitable for installing pipelines of a length that is limited to only a few hundred meters up to a few kilometers in favorable conditions, for example in a stable formation that does not collapse after drilling of the U-shaped borehole.

It is also known from International patent application WO 2012/095472 to line an oil or gas production well with a tubular that is circumferentially expanded after insertion into the borehole. In this known well lining technique the liner is inserted and expanded continuously while the borehole is being drilled, so that the expanded liner stabilizes a large fraction of the borehole during the drilling process. This known borehole drilling technique is suitable to drill boreholes with a length of several kilometers, which may in favorable conditions be up to about 25 kilometers.

If pipelines are laid to transport crude oil from a production site to a processing and/or distribution site in for example arctic, underwater or otherwise difficult accessible and/or environmentally sensitive regions then there is a need to install pipelines that may span a lateral distance of several hundred or even several thousand kilometers without generating significant environmental impact caused by digging deep trenches in the earth crust.

Therefore there is a need for an improved method and system for transporting hydrocarbon fluid over long distances, wherein the pipeline is adequately protected and a minimum of environmental impact is generated. Furthermore, there is a need for an improved method and system for transporting hydrocarbon fluid over long distances in arctic regions, such that at least a significant part of the pipeline system is adequately protected from frost, permafrost, moving ice and/or an instable overburden above a frozen underburden.

SUMMARY OF THE INVENTION

In accordance with the invention there is provided a method for transporting a hydrocarbon fluid, the method comprising:

drilling a chain of double ended U-shaped boreholes into the earth crust, such that at least one pair of the boreholes has an adjacent pair of upper ends at or near the earth surface;

lining each of the boreholes with an at least partly expanded impermeable liner comprising an expandable tubular, which is circumferentially expanded after insertion into the borehole;

interconnecting each pair of adjacent upper ends of the chain of lined U-shaped boreholes by a connection conduit; and transporting the hydrocarbon fluid through a transportation pipeline provided by the chain of lined U-shaped boreholes and the connection conduit.

The pipeline may comprise one or more W-shaped sections, which are each formed by at least one pair of adjacent lined U-shaped boreholes and at least one of the connection conduits and may be located underwater or in an arctic region such that at least one of the W-shaped sections comprises a lower part located below an at least occasionally frozen part of the earth crust.

The pipeline may span a lateral distance of at least 60 km and at least one of the U-shaped boreholes may have a length between 5 and 50 km.

The step of lining at least one of the U-shaped boreholes may comprise bending the tubular radially outward and backwards in a semi-toroidally shaped bending zone, which moves from one end towards an opposite end of the tubular, thereby forming an expanded tubular section of a gradually increasing length around an unexpanded tubular section of a gradually decreasing length and the step of increasing the length of the expanded tubular section may comprise pushing the unexpanded tubular section into the expanded tubular section until the tubular is expanded along its entire length.

The unexpanded tubular section may be arranged around a drill string of a directional drilling assembly comprising a downhole motor with an output shaft that rotates a drill bit comprising a pilot bit and under-reamer relative to the drill string about an axis of rotation that is oriented at an acute angle relative to a central axis of the drill string, which assembly may be equipped with a sensor for monitoring a distance between the drill bit and the bending zone and means to adjust the speed at which the unexpanded tubular is inserted into the borehole such that the monitored distance is substantially constant.

The impermeable liner may form an outer liner and at least one of the U-shaped boreholes may furthermore comprise an additional impermeable inner liner, which may be inserted into the outer liner by pulling and/or pumping the inner liner into the outer liner and which inner liner may not be expanded after insertion into the outer liner.

In accordance with the invention there is furthermore provided a system for transporting a hydrocarbon fluid, the system comprising:

a chain of double ended U-shaped boreholes drilled through the earth crust, such that at least one pair of the boreholes has an adjacent pair of upper ends at or near the earth surface;

an impermeable liner in each of the boreholes, which liner comprises along at least part of its length a tubular, which is circumferentially expanded after insertion into the borehole; and a connection conduit interconnecting each pair of adjacent upper ends of the chain of lined U-shaped boreholes.

These and other features, embodiments and advantages of the method and/or system according to the invention are described in the accompanying claims, abstract and the following detailed description of non-limiting embodiments depicted in the accompanying drawings, in which description reference numerals are used which refer to corresponding reference numerals that are depicted in the drawings.

Similar reference numerals in different figures denote the same or similar objects.

DETAILED DESCRIPTION OF THE DEPICTED EMBODIMENTS

Figure 1:
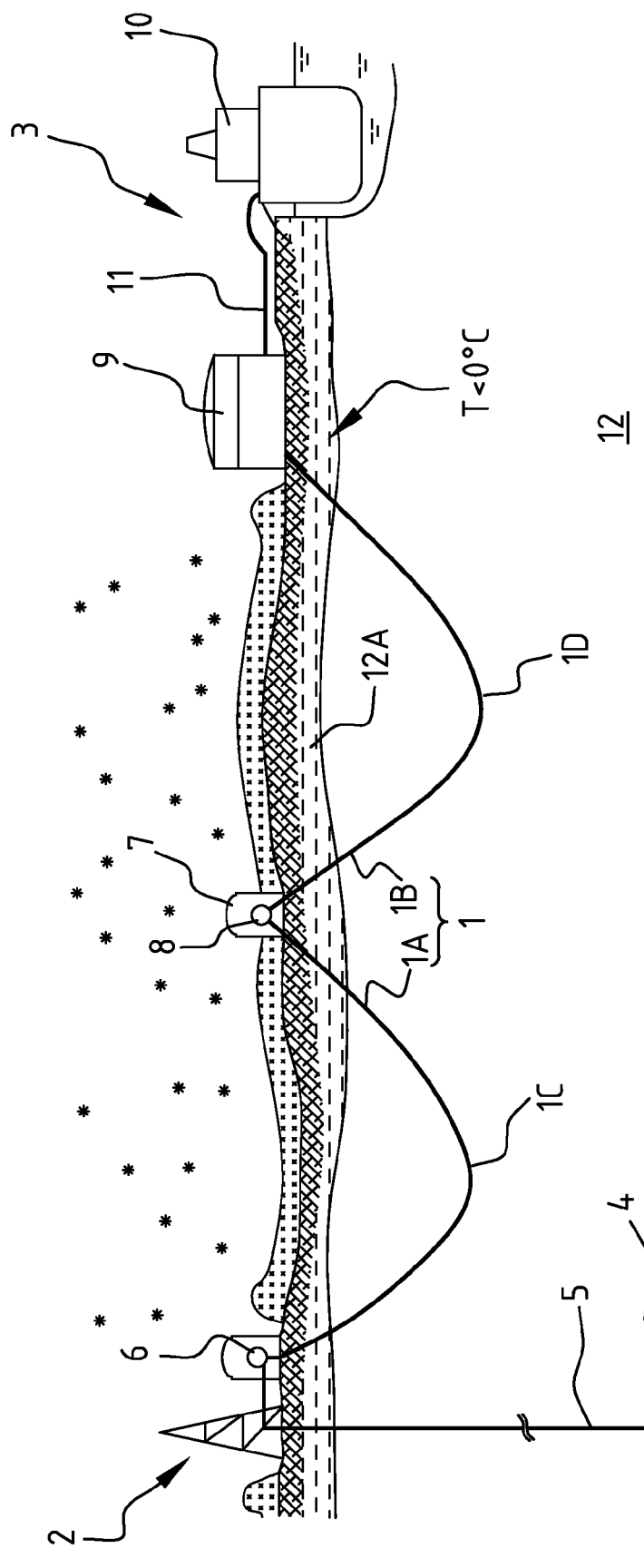
FIG. 1 is a schematic longitudinal sectional view of a W-shaped hydrocarbon fluid transportation pipeline comprising U-shaped borehole sections lined with an expandable liner according to the invention in an arctic region.

FIG. 1 shows a W-shaped hydrocarbon fluid transportation pipeline 1 according to the invention.

The W-shaped pipeline 1 is configured to transport crude oil and/or natural gas from a production site 2 to a shipping terminal 2 or other distribution or conversion site in an arctic region 3.

At the production site 2 crude oil and/or natural gas is produced from a subsurface oil and/or gas bearing formation 4 via a production well 5 to a treating, separation and/or pumping facility 5 from where the treated crude oil or natural gas stream is transported via the first U-shaped section 1A of the W-shaped pipeline 1 to a fluid transfer facility 7 comprising a connection conduit 8 that may provide a pump and/or a heater. Subsequently the treated crude oil or natural gas flows via the second U-shaped section 1B of the W-shaped pipeline 1 into a storage tank 9 from where it is pumped into a tanker 10 via a heated surface conduit and hose assembly 11.

The U-shaped sections 1A and 1B may each span a lateral distance of length of several, up to 30, kilometers and may have lower sections 1C and 1D that are located several tens or hundred meters depth, so that the lower sections 1C and 1D, which form a substantial part of the length of the W-shaped pipeline 1, are located underneath an at least occasionally frozen (illustrated as T<0° C.) part 12A of the earth crust 12. The upper parts of the W-shaped pipeline that traverse the at least occasionally frozen part 12A of the earth crust 12 may be thermally insulated and/or provided with heating means (not shown) in order to keep the temperature of the crude oil and/or natural gas above the freezing point in order to prevent freezing of any associated water and to inhibit deposition of wax, paraffin and hydrates.

Figure 2:
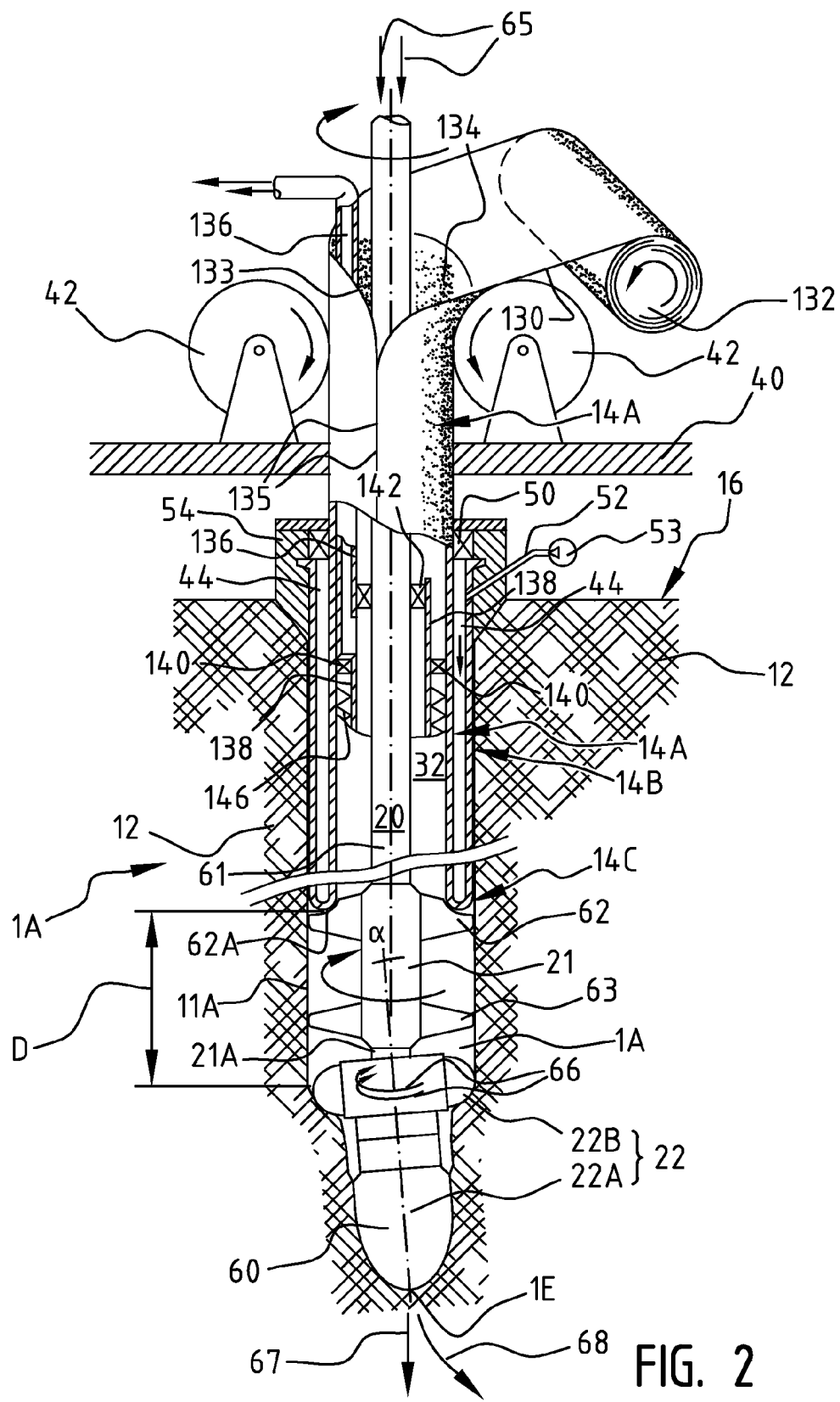
FIG. 2 is a schematic longitudinal sectional view of a U-shaped borehole drilling and liner expansion technique that may be used to install the U-shaped sections of the W-shaped hydrocarbon fluid transportation pipeline shown in FIG. 1.

FIG. 2 shows how one of the U-shaped wellbores 1A and 1B is drilled and lined within the earth crust 12. A radially expandable tubular element 14, for instance an expandable steel liner, extends from the earth surface 16 down into the wellbore 1 that will subsequently form one of the U-shaped boreholes 1A or 1B shown in FIG. 1. The tubular element 14 comprises an unexpanded tubular section 14A, a semi-toroidal shaped bending zone 14C and a circumferentially expanded tubular section 14B that surrounds the unexpanded section 14A. An outer diameter of the expanded tubular section 10 may be substantially equal to the inner diameter of the borehole 1.

Although upper part of the borehole 1A shown in FIG. 2 extends vertically into the earth crust 12, the upper part may have a tilted orientation. Herein below, upper end of the borehole 1A refers to the end at the earth surface 16, and lower end refers to the end down hole.

At its lower end, the wall of the unexpanded tubular liner section 14A bends in the bending zone 14C radially outward and in axially reverse direction. The bending zone 14C is at each side U-shaped in cross-section, so that the bending zone 14C has a semi-toroidal or semi-doughnut shape. It will be understood that in the bending zone 14C the wall of the expanding tubular will be stretched in a circumferential direction and simultaneously be bent and unbent. The material of the tubular element 14 may be a flexible ductile material. Preferably, the material of the tubular element is plastically deformed in the bending zone 14C, so that the material retains the expanded shape after bending outwards. The material preferably has a suitable strength to support the borehole and prevent collapse of the borehole. The tubular element may be made of a suitable material such as metal or steel. A wall thickness of the liner may be in the range of 1.5 to 30 mm.

A drill string 20 may extend from surface through the unexpanded liner section 14A to the lower end 1E of the first borehole section 1A. The lower end of the drill string 20 is provided with a downhole drilling motor 21 and drill bit 22 comprising a pilot bit 22A having an outer diameter which is slightly smaller than the internal diameter of the unexpanded liner section 14A, and a reamer section 22B having an outer diameter adapted to drill the borehole 1A to its nominal diameter. The reamer section 22B may be radially retractable to a smaller outer diameter, allowing it to pass through the unexpanded liner section 14A, so that the drill bit 22 can be retrieved through the unexpanded liner section 8 to the earth surface 16.

The drill string 20 may comprise multiple drill pipe sections that are mutually connected at respective ends by male and female threaded drill pipe connections 30. An annular space 32 between the drill string 20 and the unexpanded tubular section 8 is referred to as the drilling annulus 32.

FIG. 2 also shows a rig floor 40, which is elevated with respect to the earth surface 16 and encloses an upper end of the drill string 20 and of the unexpanded tubular section 8. The rig floor 40 is part of a drilling rig, which is however not shown in its entirety. Pipe guiding wheels 42, conveyor belts and/or other unexpanded tubular pushers (not shown) may be mounted at the rig floor 40, and engage the unexpanded tubular section 14A. The pipe guiding wheels 42 may be driven by electric motors (not shown) and firmly engage the outer surface of the unexpanded tubular section 14A thereby to force the unexpanded tubular section 14A to move into the expanded tubular section 14B at a predetermined speed, which is substantially equal to the speed at which the drill bit 22 proceeds into the earth crust 12. Other embodiments of the guide wheels 42, conveyor belt and/or other pipe pusher are conceivable, which will be able to exert downward or upward force to the unexpanded section.

A sealing device 50 can be connected to the upper end of the expanded liner section 14B to provide a seal between the unexpanded and expanded liner sections 14A and 14B. Herein, the sealing device 50 enables the unexpanded liner section 8 to slide in axial direction relative to the sealing device 50. The sealing device 50 is connected to a wellhead 51 that comprises a conduit 52 which is connected to a pump 53 for pumping fluid into or out of a blind annulus 44 between the unexpanded and expanded tubular sections 14A and 14B. The blind annulus 44 is referred to as "blind" as it totally enclosed since it closed at its upper end by the sealing device 50 and at its lower end by the bending zone 14C so that it is fully enclosed. The pump 53 may be configured to maintain a predetermined fluid pressure in the blind annulus 44.

The upper end 14D of the expanded tubular section 14B forms a flange which is secured within a groove in the wellhead 54 to prevent axial movement of the expanded tubular section 14B.

FIG. 2 further shows how the unexpanded tubular section 14A is at its upper end formed from a metal sheet 130 wound on a reel 132. The metal sheet 130 has opposite edges 133, 134. After unreeling from the reel 132, the metal sheet 130 is bent into a tubular shape and the edges 133, 134 are interconnected, for instance by welding, to form the unexpanded tubular section 14A. Consequently, the expandable tubular may comprise a longitudinal weld 135.

A fluid conduit 136 extends from the interior of the unexpanded tubular section 14A, to above the upper end of the unexpanded tubular section 14A. The fluid conduit 136 may at its lower end be connected to, or integrally formed with, a tube 138 located in the unexpanded tubular section 14A. A first annular seal 140 seals the tube 138 relative to the unexpanded liner section 14A, and a second annular seal 142 seals the tube 138 relative to the drill string 20. The fluid conduit 136 is in fluid communication with the interior space of the tube 38 via an opening 144 provided in the wall of the tube 138. Furthermore the tube 138 is provided with gripper means 146 allowing upward sliding, and preventing downward sliding, of the tube 138 relative to the unexpanded liner section 14A. The first annular seal 140 allows upward sliding of the tube 138 relative to the unexpanded liner section 14A.

FIG. 2 also shows that the steerable drilling assembly used to drill the U-shaped well comprises a downhole drilling motor 21 with a tilted output shaft 21A that is connected to the drill bit 22. The axis of rotation 60 of the output shaft 21A is oriented at a predetermined angle α with respect to a longitudinal axis 61 of the drill string 20 and motor housing 21, which is oriented in a predetermined substantially centralized position within the borehole 1A by upper and lower stabilizers 62 and 63.

The downhole drilling motor 21 may be a mud driven Moineau drilling motor, which induces the output shaft 21A to rotate relative to the motor housing 21 in response to pumping of drilling fluid through the drill string 20 as illustrated by arrows 65 and 66. If simultaneously the drill string 20 rotates within the borehole 1A then the drilled borehole will be substantially straight as illustrated by straight arrow 67.

If the drill string is not rotated within the borehole 1A while the output shaft 21A rotates relative to the stationary motor housing 21 and drill string 20, only the output shaft 21A rotates at the predetermined angle α relative to the central axis 61 of the drill string 20 so that a deviated (i.e. non-straight or curved) borehole section is drilled by the drill bit 22 as illustrated by curved arrow 68.

As illustrated in FIG. 2 it is preferred to both under-ream and steer the drilling. Herein, under-ream means enlarging the borehole with respect to the outer diameter of the pilot bit 22A. This is typically achieved by using the underreamer 22B having a larger outer diameter.

FIG. 2 also shows that it is preferred to minimize the distance D between the bending zone 14C and the drill bit 22. The upper surfaces 62A of the blades of the upper stabilizer assembly 62 may thereto be equipped with sensors to monitor the distance between said surfaces 62A and the bending zone 14C and with sensors to monitor a contact pressure between said surfaces and the bending zone 14C and have a semi-toroidal shape and be covered with a low friction material, such as PolyTetraFluoroEthylene (PTFE, which material is marketed under the trademark Teflon). By keeping the bending zone 14C at or close to the upper stabilizer assembly 62 the length D of the uncased borehole section 11A between the bending zone 14C and underreamer bit 22B is kept relatively small. The relatively small distance D implies a relatively short uncased open hole section 11A, which is a major advantage of the lining system according to the invention with respect to conventional casing systems.

The invention claimed is:

1. A method for transporting a hydrocarbon fluid, the method comprising:
    drilling a chain of double ended U-shaped boreholes into the earth crust, such that at least one pair of the boreholes has an adjacent pair of upper ends at or near the earth surface;
    lining each of the U-shaped boreholes with an at least partly expanded impermeable liner comprising an expandable tubular, which is circumferentially expanded after insertion into the borehole, wherein lining each of the U-shaped boreholes comprises bending the tubular radially outward and backwards in a semi-toroidally shaped bending zone, which moves from one end towards an opposite end of the tubular, thereby forming an expanded tubular section of a gradually increasing length around an unexpanded tubular section of a gradually decreasing length and wherein the unexpanded tubular section is arranged around a drill string of a directional drilling assembly, which is equipped with a sensor for monitoring a distance D between a drill bit and the bending zone and with means to adjust the speed at which the unexpanded tubular is inserted into the borehole such that the monitored distance D between the drill bit and bending zone remains is substantially constant;
    interconnecting each pair of adjacent upper ends of the chain of lined U-shaped boreholes by a connection conduit; and
    transporting the hydrocarbon fluid through a transportation pipeline provided by the chain of lined U-shaped boreholes and the connection conduit.

2. The method of claim 1, wherein the pipeline comprises at least one W-shaped section, which is formed by at least one pair of adjacent lined U-shaped boreholes and at least one of the connection conduits.

3. The method of claim 2, wherein the pipeline comprises a plurality of interconnected predominantly underground W-shaped sections.

4. The method of claim 2, wherein the pipeline is located in an arctic region and at least one of the W-shaped sections comprises a lower part, which is located below an at least occasionally frozen part of the earth crust.

5. The method of claim 1, wherein the pipeline is an underwater pipeline.

6. The method of claim 1, wherein the pipeline spans a lateral distance of at least 60 km and at least one of the U-shaped boreholes has a length between 5 and 50 km.

7. The method of claim 1, wherein the step of increasing the length of the expanded tubular section comprises pushing the unexpanded tubular section into the expanded tubular section until the tubular is expanded along its entire length.

8. The method of claim 1, wherein the drill bit comprises a pilot bit and an under-reamer.

9. The method of claim 1, wherein the directional drilling assembly comprises a downhole drilling motor with an output shaft which rotates the drill bit relative to the drill string about an axis of rotation that is oriented at an acute angle relative to a central axis of the drill string.

10. The method of claim 1, wherein the impermeable liner forms an outer liner and at least one of the U-shaped boreholes furthermore comprises an additional impermeable inner liner, which is inserted into the outer liner.

11. The method of claim 10, wherein the additional impermeable inner liner is inserted into the outer liner by pulling and/or pumping the inner liner into the outer liner and the inner liner is not expanded after insertion into the outer liner.

\* \* \* \* \*